United States Patent
Inoue

(10) Patent No.: US 6,736,465 B2
(45) Date of Patent: May 18, 2004

(54) SYSTEM FOR ESTIMATING BRAKE-FLUID PRESSURE

(75) Inventor: Gen Inoue, Kanagawa (JP)

(73) Assignee: Hitachi Unisia Automotive, Ltd., Atsugi (JP)

(*) Notice: Subject to any disclaimer, the term of this patent is extended or adjusted under 35 U.S.C. 154(b) by 0 days.

(21) Appl. No.: 10/320,391

(22) Filed: Dec. 17, 2002

(65) Prior Publication Data

US 2003/0111900 A1 Jun. 19, 2003

(30) Foreign Application Priority Data

Dec. 18, 2001 (JP) ........................................ 2001-384517

(51) Int. Cl.$^7$ ................................................. B60T 8/36
(52) U.S. Cl. ...................... 303/119.1; 303/20; 303/191; 303/116.1; 303/187
(58) Field of Search ............................... 303/3, 15, 166, 303/187, 20, 191, 199, 116.1, 119.1

(56) References Cited

U.S. PATENT DOCUMENTS

| | | | | |
|---|---|---|---|---|
| 5,545,929 A | * | 8/1996 | Fijioka et al. | 303/166 |
| 5,700,069 A | * | 12/1997 | Yokoyama et al. | 303/115.2 |
| 5,845,974 A | * | 12/1998 | Kamikado et al. | 303/115.2 |
| 5,992,952 A | * | 11/1999 | Kubota | 303/191 |
| 6,003,961 A | * | 12/1999 | Binder et al. | 303/191 |
| 6,508,522 B1 | * | 1/2003 | Li et al. | 303/139 |
| 2003/0111896 A1 | * | 6/2003 | Imamura et al. | 303/11 |
| 2003/0214177 A1 | * | 11/2003 | Kusano et al. | 303/113.1 |

FOREIGN PATENT DOCUMENTS

| JP | 1159407 | * | 3/1999 |
|---|---|---|---|
| JP | 2001124228 | * | 5/2001 |

* cited by examiner

*Primary Examiner*—Jack Lavinder
*Assistant Examiner*—Devon Kramer
(74) *Attorney, Agent, or Firm*—Foley & Lardner LLP

(57) ABSTRACT

A brake control system includes an ECU having an estimate part which is so constructed as to: totalize an influent amount of fluid in a brake actuator in accordance with an output time of a valve opening drive signal of a control signal and a supply amount per unit time of fluid in a pressure control valve; estimate an amount of fluid in the brake actuator in accordance with the influent amount as totalized; estimate a value of the fluid pressure within the brake actuator in accordance with the amount of fluid as estimated; and carry out correction for obtaining a supply amount of fluid in the brake actuator when a time of retaining operation performed by the control signal is smaller than a predetermined value, correction being performed by adding a correction value corresponding to the time to the output time of the valve opening drive signal of the control signal.

12 Claims, 7 Drawing Sheets

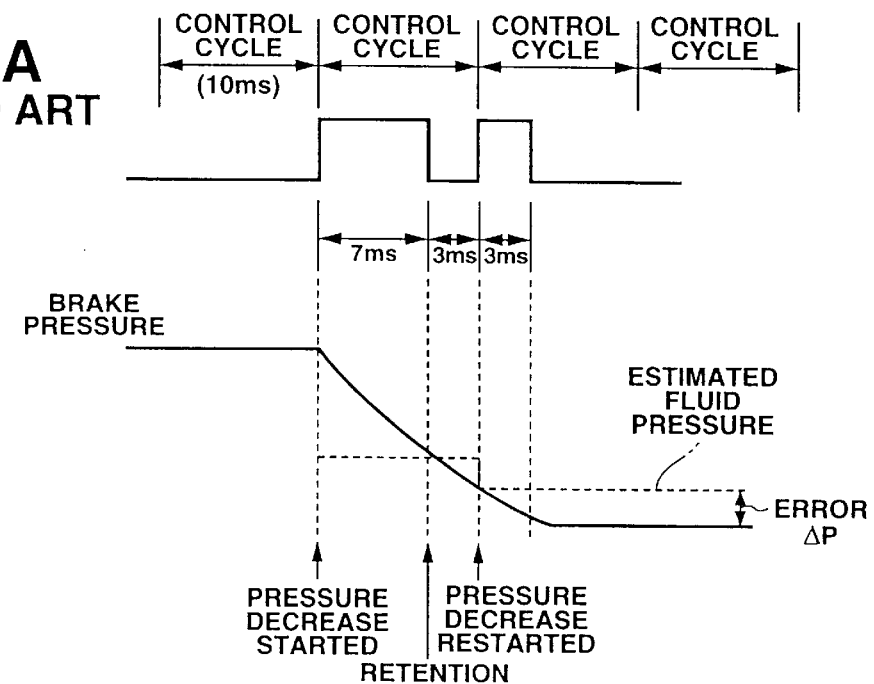
FIG.7A RELATED ART
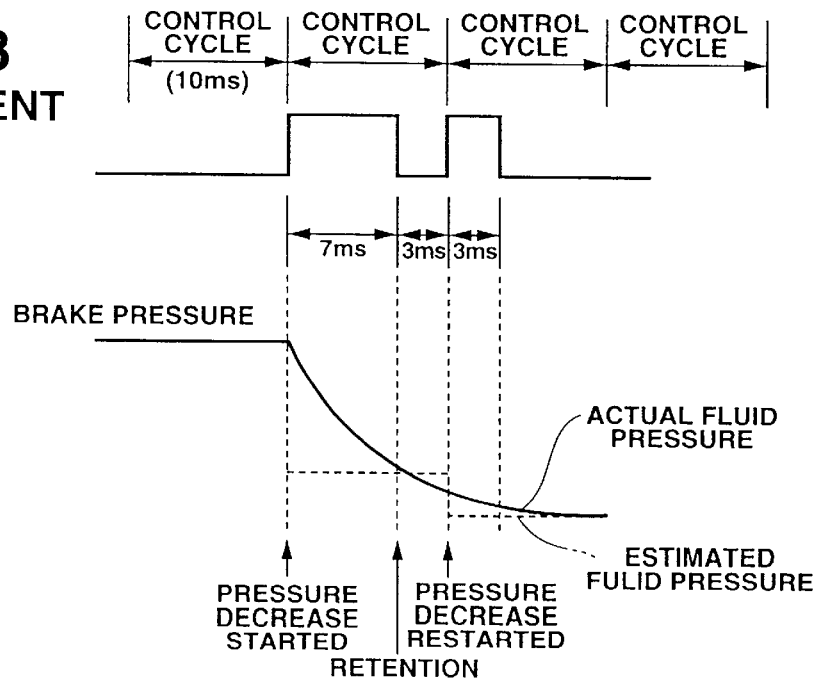
FIG.7B EMBODIMENT

SYSTEM FOR ESTIMATING BRAKE-FLUID PRESSURE

BACKGROUND OF THE INVENTION

The present invention relates generally to a brake control system, and more particularly, to a system for estimating the brake-fluid pressure.

In recent years, vehicle-mounted braking devices have various functions added. Such braking devices are known, for example, in the form of an antiskid braking system for achieving shortening of the braking distance while maintaining the vehicle behavior stable by preventing wheel lock, a traction control system for preventing spin of driving wheels during vehicle acceleration and the like, a brake assist device constructed so that when the brake-fluid pressure operated by a driver is insufficient, this insufficiency of brake-fluid pressure is supplied to a wheel cylinder, and a vehicle-stability control system for securing the running stability of the vehicle by providing a braking force to the wheels regardless of presence of brake operation by a driver so as to remove oversteer or understeer of the vehicle.

With the above braking devices, accurate grasp of the fluid pressure within the wheel cylinder and that produced by operation of a brake pedal will allow more precise control of a driving time or the like of a control valve for controlling the fluid pressure, leading to further enhanced control accuracy of the braking devices. One approach is to provide a fluid-pressure sensor to a master cylinder or a wheel cylinder so as to measure the fluid pressure within the master cylinder or the wheel cylinder. However, this approach involves an increase in manufacturing cost of the device.

Due to such problem of manufacturing cost, another approach is proposed wherein only the fluid pressure within the master cylinder is measured by the fluid-pressure sensor, and calculation is made as to how this pressure varies in accordance with a fluid-pressure model of the braking device to estimate the fluid pressure within the wheel cylinder. Specifically, a variation in the fluid pressure calculated in accordance with a drive signal for the braking device is added to an estimated fluid pressure (previous value) within the wheel cylinder obtained using the fluid pressure within the master cylinder, thus estimating a current value of the fluid pressure within the wheel cylinder.

However, an error can occur in the estimated current value. From a study of the cause of occurrence of the error made by the inventor, it was found that the error occurred depending on the operation responsivity of a solenoid valve. Specifically, as is well known, in connection with fulfillment of brake-fluid pressure control through the solenoid valve, means for executing low-cost and high-accuracy control include output of a duty control signal to the ON-OFF solenoid valve. The solenoid valve comprises an actuating member such as a spool. Then, it was found that due to its mass and operation resistance, the actuating member could not be driven when output of the duty control signal for a drive signal lasts a short time.

Specifically, when outputting to the solenoid valve control signals for operation of opening→closing→opening and that the closing signal has an output time extremely short, i.e. when outputting a control signal having an opening duty ratio extremely high or a closing duty ratio extremely low, the actuating member such as a spool cannot be actuated and maintained in the open state due to the above operation characteristics. In this case, though commands for operation of opening→closing→opening are provided by the control signals, the solenoid valve is actuated in a way of opening→opening→opening.

Therefore, when the solenoid valve includes a valve for increasing the fluid pressure within the wheel cylinder, an estimated value of the fluid pressure to be obtained in accordance with the drive signal is obtained by calculating a "closing" part of operation of opening→closing→opening. However, since actual operation of the solenoid valve is maintained in the "open" state during a command for "closing" operation as well, brake fluid is supplied to the wheel cylinder, leading to the actual fluid pressure higher than the estimated value.

On the other hand, when the solenoid valve includes a valve for decreasing the fluid pressure within the wheel cylinder, estimation is carried out assuming that a pressure decrease is not effective for a "closing" part of operation of opening→closing→opening. However, since actual operation of the solenoid valve is maintained in the "open" state during a command for "closing" operation as well, the actual fluid pressure is lower than the estimated value.

SUMMARY OF THE INVENTION

It is, therefore, an object of the present invention to provide a system for estimating the brake-fluid pressure, which contributes to an enhancement in estimation accuracy of the brake-fluid pressure within the wheel cylinder.

The present invention provides generally a brake control system for a motor vehicle, which comprises: a brake actuator actuated by a fluid pressure; a pressure control valve which adjusts the fluid pressure within the brake actuator, the pressure control valve selectively carrying out operation for supplying fluid to the brake actuator, operation for discharging fluid from the brake actuator, and operation for retaining fluid in the brake actuator; and an ECU which controls the pressure control valve, the ECU providing to the pressure control valve a first control signal including a duty-ratio signal comprising a valve opening drive signal as a supplying operation signal and a retaining operation signal upon the supplying operation of the pressure control valve, the ECU comprising an estimate part which is so constructed as to: totalize an influent amount of fluid in the brake actuator in accordance with an output time of the valve opening drive signal of the first control signal and a supply amount per unit time of fluid in the pressure control valve; estimate an amount of fluid in the brake actuator in accordance with the influent amount as totalized; estimate a value of the fluid pressure within the brake actuator in accordance with the amount of fluid as estimated; and carry out correction for obtaining a supply amount of fluid in the brake actuator when a time of the retaining operation performed by the first control signal is smaller than a predetermined value, the correction being performed by adding a correction value corresponding to the time to the output time of the valve opening drive signal of the first control signal.

BRIEF DESCRIPTION OF THE DRAWINGS

The other objects and features of the present invention become apparent from the following description with reference to the accompanying drawings, wherein:

FIGS. 7A–7B are time charts showing examples of operation of braking control.

DETAILED DESCRIPTION OF THE INVENTION

Figure 1:
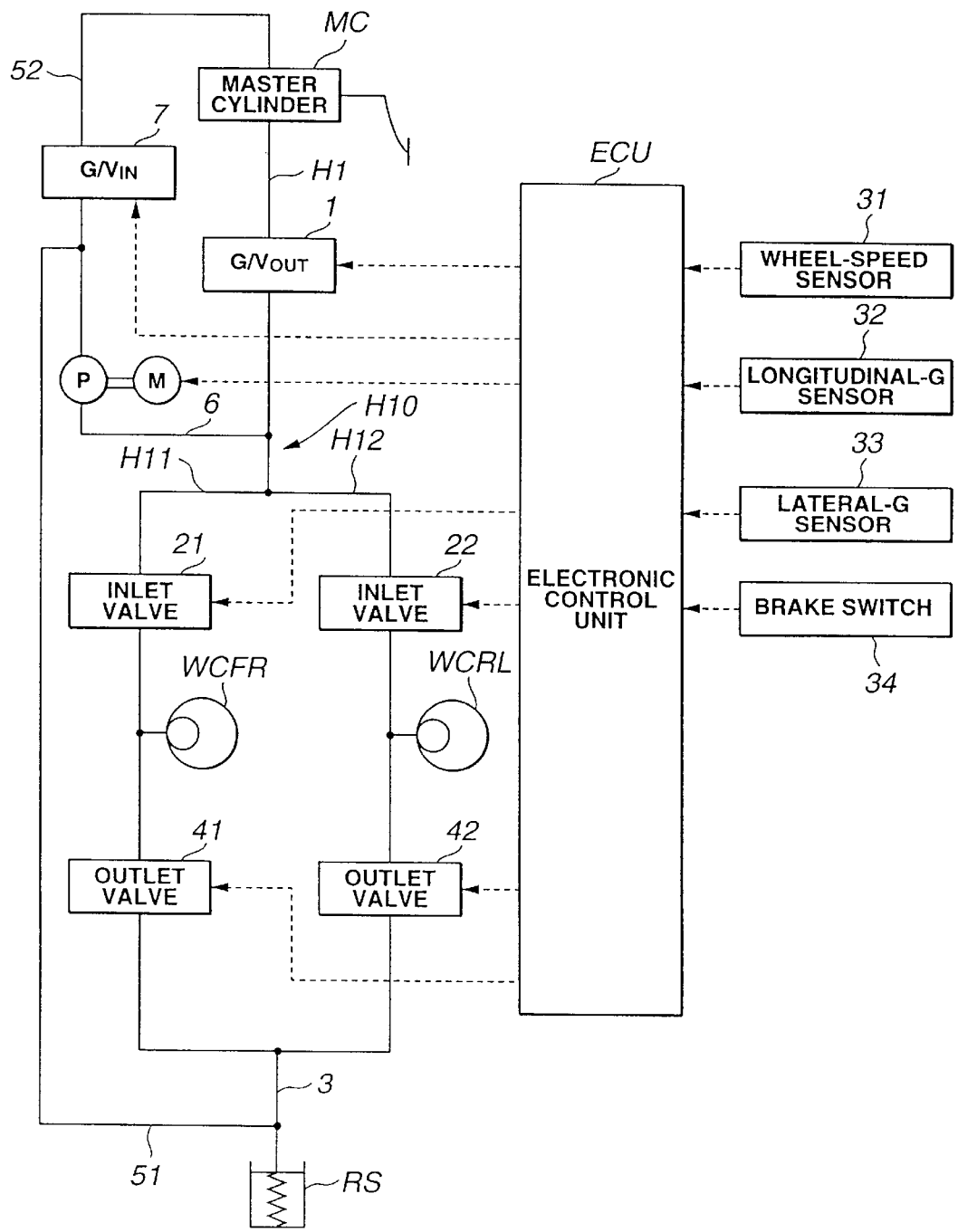
FIG. 1 is a block diagram showing a brake control system to which a system for estimating the brake-fluid pressure according to the present invention is applied.

Referring to the drawings, a description is made about a system for estimating the brake-fluid pressure embodying the present invention. Referring to FIG. 1, there is shown a brake control system to which the present invention is applied. Referring to FIG. 1, a brake line H1 is one of two systems of an X-type brake line. The X-type brake line is a line arrangement in which the lines for supplying brake fluid to wheel cylinders or brake actuators of four wheels are divided into two systems, the lines of each system being connected to one of the front wheels and one of the rear wheels in such a way that one of the front wheel is a left wheel, and one of the rear wheels is a right wheel.

Brake line H1 is divided into branch lines H11, H12 which are connected to wheel cylinders WCFR, WCRL of front-right and rear-left wheels FR, RL, respectively. A normally open OUT-side gate valve 1, which is open under non-energization, is arranged in brake line H1 at a upstream position between branch lines H11, H12 and a master cylinder MC. Normally open inlet valves 21, 22 are arranged in branch lines H11, H12, respectively. Normally closed outlet valves 41, 42, which are closed usually and open under energization, are arranged in a drain circuit 3 connecting wheel cylinders WCFR, WCRL and a reservoir RS. Inlet valves 21, 22 and outlet valves 41, 42 correspond to pressure control valves.

Reservoir RS and master cylinder MC are connected to the suction side of a pump P through suction circuits 51, 52, respectively. A discharge circuit 6 arranged on the discharge side of pump P is connected to a supply line H10 in brake line H1 and between OUT-side gate valve 1 and inlet valves 21, 22. A normally closed IN-side gate valve 7 is arranged in suction circuit 52.

Thus, when a driver performs brake operation to generate the pressure within master cylinder MC, control is carried out to maintain OUT-side gate valve 1 in the open state and actuate the inlet valves 21, 22 and outlet valves 41, 42, adjusting the wheel-cylinder pressure or braking pressure within the range of atmospheric pressure to master-cylinder pressure, allowing execution of so-called antiskid control for preventing wheel lock.

Moreover, control is carried out to close OUT-side gate valve 1, open IN-side gage valve 7, and drive pump P. In this state, OUT-side gate valve 1 is opened appropriately to actively control the fluid pressure between OUT-side gate valve 1 and inlet valves 21, 22 at a desired value. Moreover, control is carried out to open inlet valves 21, 22 appropriately to supply desired fluid pressures to wheel cylinders WCFR, WCRL, thus generating a desired braking force. It is also carried out to open outlet valves 41, 42 appropriately to discharge the fluid pressure within wheel cylinders WCFR, WCRL to reservoir RS, achieving a desired pressure decrease, allowing the wheel-cylinder pressure or braking pressure to actively be controlled at any given pressure.

Actuation of pump P and valves 1, 21, 22, 41, 42, 7 is carried out by an electronic control unit ECU. For controlling the fluid pressures within wheel cylinders WCFR, WCRL, ECU carries out estimation of those fluid pressures. A part for carrying out fluid-pressure estimation corresponds to a system for estimating the brake-fluid pressure according to the present invention.

Figure 2:
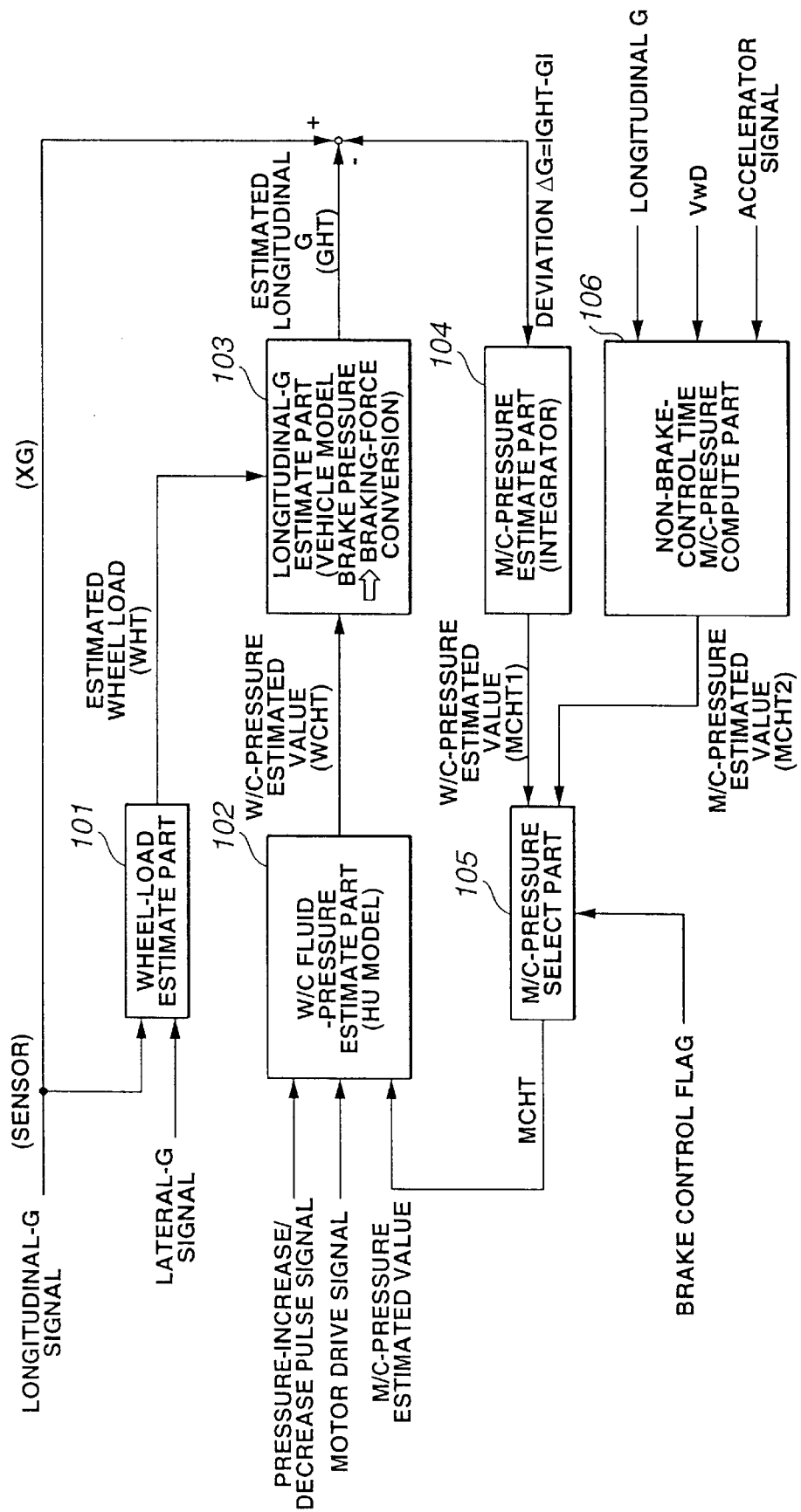
FIG. 2 is a view similar to FIG. 1, showing a brake-fluid pressure estimate part.

Referring to FIG. 2, input to the brake-fluid pressure estimate part are signals out of a wheel-speed sensor 31 for sensing accelerations of the wheels, a longitudinal-acceleration sensor (refer hereafter to as longitudinal-G sensor) 32 for sensing a longitudinal acceleration XG of the vehicle, and a lateral-acceleration sensor (refer hereafter to as lateral-G sensor) 33 for sensing a lateral acceleration YG of the vehicle, pressure-increase/decrease pulse signals to be output to OUT-side gate valve 1, inlet valves 21, 22, and outlet valves 41, 42, and an accelerator signal ACC indicative of the accelerator opening to be input from an engine control unit, not shown.

The structure of the brake-fluid pressure estimate part is described. A wheel-load estimate part 101 serves to estimate a vehicle weight acting on the wheel, i.e. a wheel load, in accordance with longitudinal acceleration XG sensed by longitudinal-G sensor 32 and lateral acceleration YG sensed by lateral-G sensor 33. The wheel load can be estimated in accordance with a vehicle model, wherein the correlation between predetermined longitudinal acceleration XG and lateral acceleration YG and a load acting on the wheel is experimentally obtained in advance, which is stored as an estimated wheel load WHT in a table and the like.

A W/C fluid-pressure estimate part 102 serves to determine a W/C-pressure estimated value WCHT or estimated fluid pressure within the wheel cylinder out of pressure-increase/decrease pulse signals or drive signals for the valves and motor M, a motor drive signal, and an M/C-pressure estimated value MCHT as will be described later and in accordance with a braking-device model obtained in advance by experiment, simulation or the like.

A longitudinal-G estimate part 103, which includes a vehicle model obtained in advance by experiment, simulation or the like, serves to estimate a longitudinal acceleration generated in the vehicle or estimated longitudinal acceleration GHT with respect to the vehicle model by using W/C-pressure estimated value WCHT and estimated wheel load WHT.

A M/C-pressure estimate part 104 serves to correct an M/C-pressure estimated value MCHT1, since when a deviation ΔG occurs between estimated longitudinal acceleration GHT and actual longitudinal acceleration XG sensed by longitudinal-G sensor 32, it is recognized that M/C-pressure estimated value MCHT or W/C-pressure estimated value WCHT has an error. Specifically, deviation ΔG between estimated longitudinal acceleration GHT and actual longitudinal acceleration XG is integrated to convert an acceleration into a braking force (=K×∫ΔGdt, where K is a coefficient). And with an M/C-pressure estimated value MCHT2 estimated at the time of non brake control by a non-brake-control time M/C-pressure compute part 106 as will be described later, i.e. an initial value of M/C-pressure estimated value MCHT at the time of brake control, the fluid pressure within master cylinder MC at the time of brake control is newly estimated. This estimated fluid pressure is used as more accurate M/C-pressure estimated value MCHT1 with an error corrected.

An M/C-pressure select part 105 serves to select one of two M/C-pressure estimated values MCHT1, MCHT2 derived in parallel from M/C-pressure estimate part 104 and non-brake-control time M/C-pressure compute part 106 by determining whether it is involved in brake-control time or non-brake-control time in accordance with a brake-control flag input to M/C-pressure select part 105.

Non-brake-control time M/C-pressure compute part 106 serves to estimate M/C-pressure estimated value MCHT2 or fluid pressure within master cylinder MC in accordance with longitudinal acceleration XG, a wheel acceleration WVD, and an accelerator signal. Specifically, the relationship between the fluid pressure provided to the wheel cylinder and longitudinal acceleration XG to be generated accordingly can be seen by experiment or the like. And the use of wheel acceleration VWD allows an influence of road-surface friction and the like for the vehicle to be reflected on estimation of the fluid pressure. In this embodiment, longitudinal acceleration XG is sensed by longitudinal-G sensor 32. Optionally, longitudinal acceleration XG may be calculated in accordance with a wheel speed VW and a variation therein. In this alternative, longitudinal acceleration XG can be determined accurately without being influenced by a road-surface gradient.

Therefore, in the brake-fluid pressure estimate part as shown in FIG. 2, when brake control is not carried out such as vehicle-stability control by the brake, but brake operation is carried out (which can be determined in accordance with a signal out of a brake switch 34 or the like provided to a brake pedal, not shown), non-brake-control time M/C-pressure compute part 106 computes M/C-pressure estimated value MCHT2 in accordance with signal of longitudinal acceleration XG sensed by longitudinal-G sensor 32 and vehicle speed VW sensed by wheel-speed sensor 31, and accelerator signal ACC.

M/C-pressure estimated value MCHT2 computed in non-brake-control time M/C-pressure compute part 106 is provided to M/C-pressure select part 105 in which one of two M/C-pressure estimated values MCHT1, MCHT2 is selected as M/C-pressure estimated value MCHT. When both brake control and brake operation are not carried out, or the accelerator pedal is not depressed, the fulfillment of zero-point correction of longitudinal-G sensor 22 allows more accurate estimation of the fluid pressure within master cylinder MC. When brake operation is not carried out, an estimated fluid pressure within master cylinder MC is set to zero.

When brake control is carried out, first, M/C-pressure select part 105 selects M/C-pressure estimated value MCHT2 obtained in non-brake-control time M/C-pressure compute part 106 as an initial value of M/C-pressure estimated value MCHT, which is provided to W/C fluid-pressure estimate part 102. Then, W/C fluid-pressure estimate part 102 estimates W/C-pressure estimated value WCHT in accordance with the braking-device model having as input M/C-pressure estimated value MCHT and drive signals of the valves and motor M. Then, longitudinal-G estimate part 103 estimates a current longitudinal acceleration generated in the vehicle as estimated longitudinal acceleration GHT in accordance with the vehicle model having as input W/C-pressure estimated value WCHT and estimated wheel load WHT estimated in wheel-load estimate part 101.

Estimated longitudinal acceleration GHT estimated in such a way is compared with actual longitudinal acceleration XG sensed by longitudinal-G sensor 32 to verify accuracy of estimated longitudinal acceleration GHT. The verification of estimated longitudinal acceleration GHT is equivalent to that of W/C-pressure estimated value WCHT or M/C-pressure estimated value MCHT, so that when no deviation ΔG exists between estimated longitudinal acceleration GHT and actual longitudinal acceleration XG, it can be considered that W/C-pressure estimated value WCHT or M/C-pressure estimated value MCHT is a correct value that reflects actual occurrence.

On the other hand, when deviation ΔG exits between estimated longitudinal acceleration GHT and actual longitudinal acceleration XG, it is recognized that MIC-pressure estimated value MCHT or W/C-pressure estimated value WCHT has an error. Thus, M/C-pressure estimated part 104 corrects M/C-pressure estimated value MCHT1. Corrected M/C-pressure estimated value MCHT1 is provided to M/C-pressure select part 105 in which it is selected as M/C-pressure estimated value MCHT, then the above estimation is repeatedly carried out.

Figure 3:
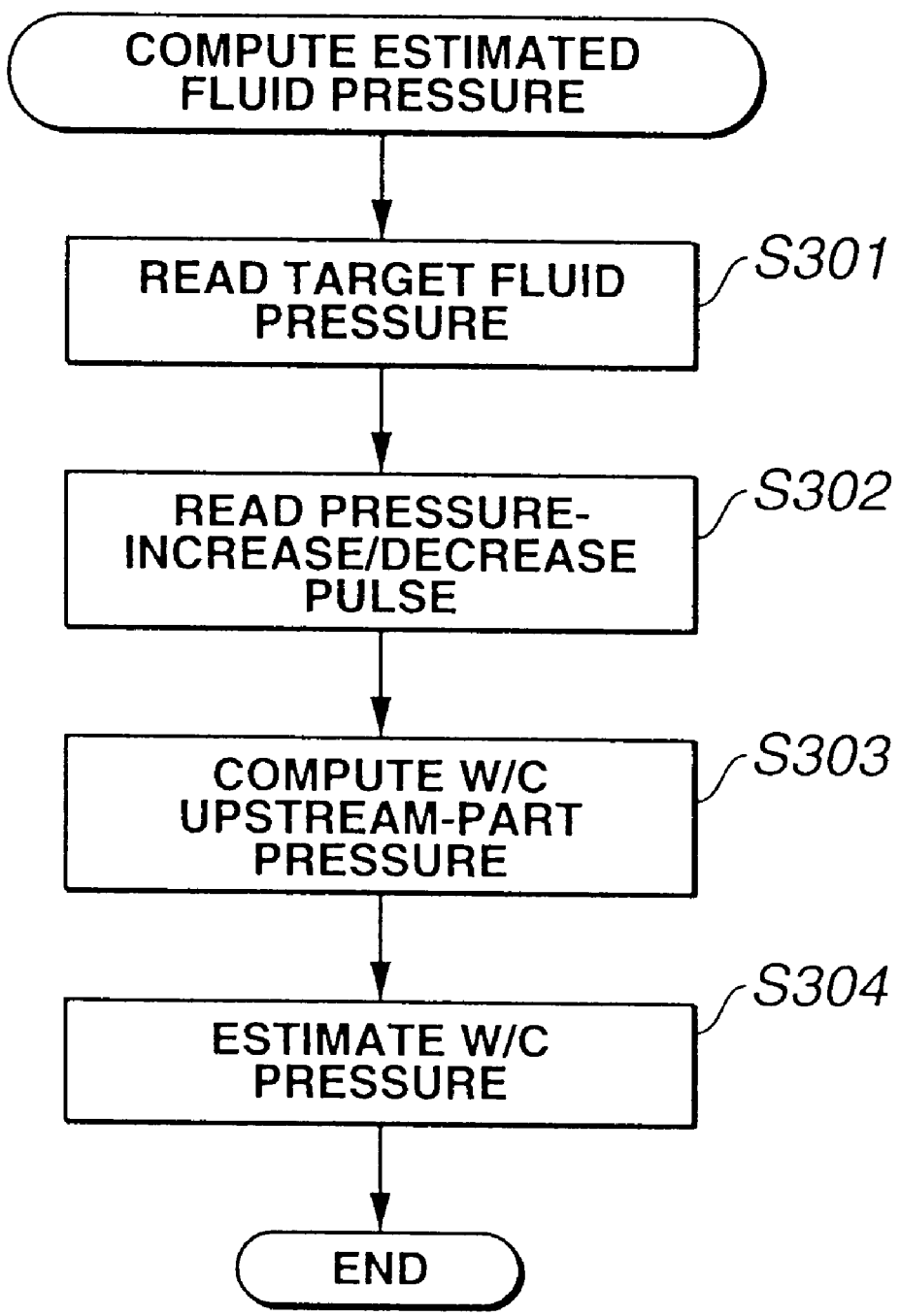
FIG. 3 is a flowchart showing operation of the embodiment.

The determination of W/C-pressure estimated value WCHT in W/C-pressure estimate part 102 is carried out using the system for estimating the brake-fluid pressure according to the present invention. Referring to FIG. 3, there is shown a processing flow up to determination of W/C-pressure estimated value WCHT executed by the system.

Referring to FIG. 3, at a step S301, processing is carried out to read a target fluid pressure. The target fluid pressure is determined as target W/C pressure for obtaining a required braking force, for example, in a part for carrying out braking-force control such as vehicle-stability control. At step S301, the target fluid pressure is read from the part for carrying out braking-force control.

At a step S302, processing is carried out to read a pressure-increase/decrease pulse. The pressure-increase/decrease pulse is a drive pulse for controlling drive of OUT-side gate valve 1, inlet valves 21, 22, outlet valves 41, 42, and motor M required for obtaining the target fluid pressure.

At a step S303, processing is carried out to compute a W/C upstream-part pressure PHLHT. W/C upstream-part pressure PHLHT is a pressure in supply line H10 between OUT-side gate valve 1 and inlet valves 21, 22, which can be converted from the amount of brake fluid in supply line H10. The amount of brake fluid in supply line H10 can be obtained by integrating a variation in fluid amount per unit time in supply line H10. The variation in fluid amount per unit time is obtained by subtracting the flow amount per unit time discharged from supply line H10 to master cylinder MC in accordance with an open time of OUT-side gate valve 1 and the flow amount per unit time flowing from supply line H10 to wheel cylinders WCFR, WCRL in accordance with an open time of inlet valves 21, 22 from the discharge amount per unit time supplying from pump P to supply line H10 in accordance with an energization time of pump P.

At a step S304, processing is carried out to estimate the W/C pressure. This processing is to obtain W/C estimated value WCHT, which is obtained, in the similar way to the above W/C upstream-part pressure PHLHT, by carrying out pressure conversion of a variation in fluid amount in wheel cylinders WCFR, WCRL, i.e. the amount of brake fluid obtained by subtracting the flow amount discharged from wheel cylinders WCRF, WCRL to reservoir RS in accordance with an open time of outlet valves 41, 42 from a totalized value of the flow amount per unit time flowing from supply line H10 to wheel cylinders WCFR, WCRL in accordance with an open time of inlet valves 21, 22. The detail of this processing will be described later.

Figure 4:
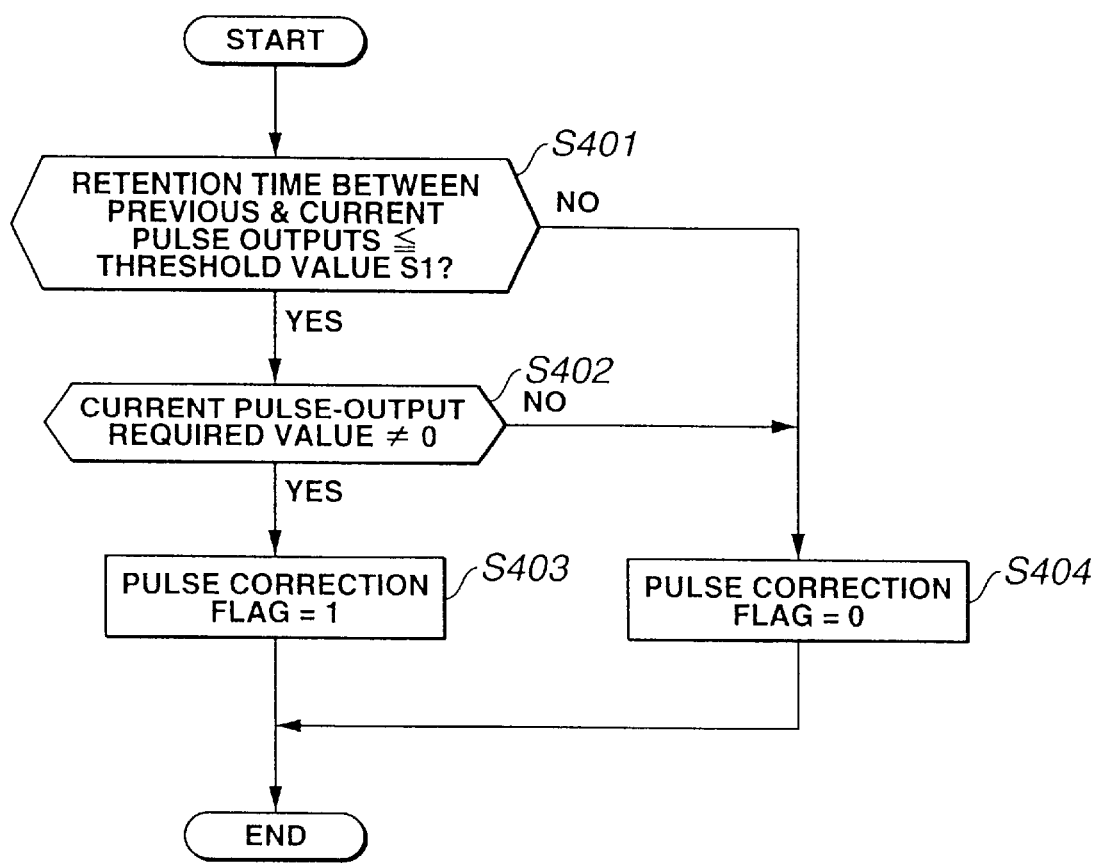
FIG. 4 is a chart similar to FIG. 3, showing operation of the embodiment.
Figure 5:
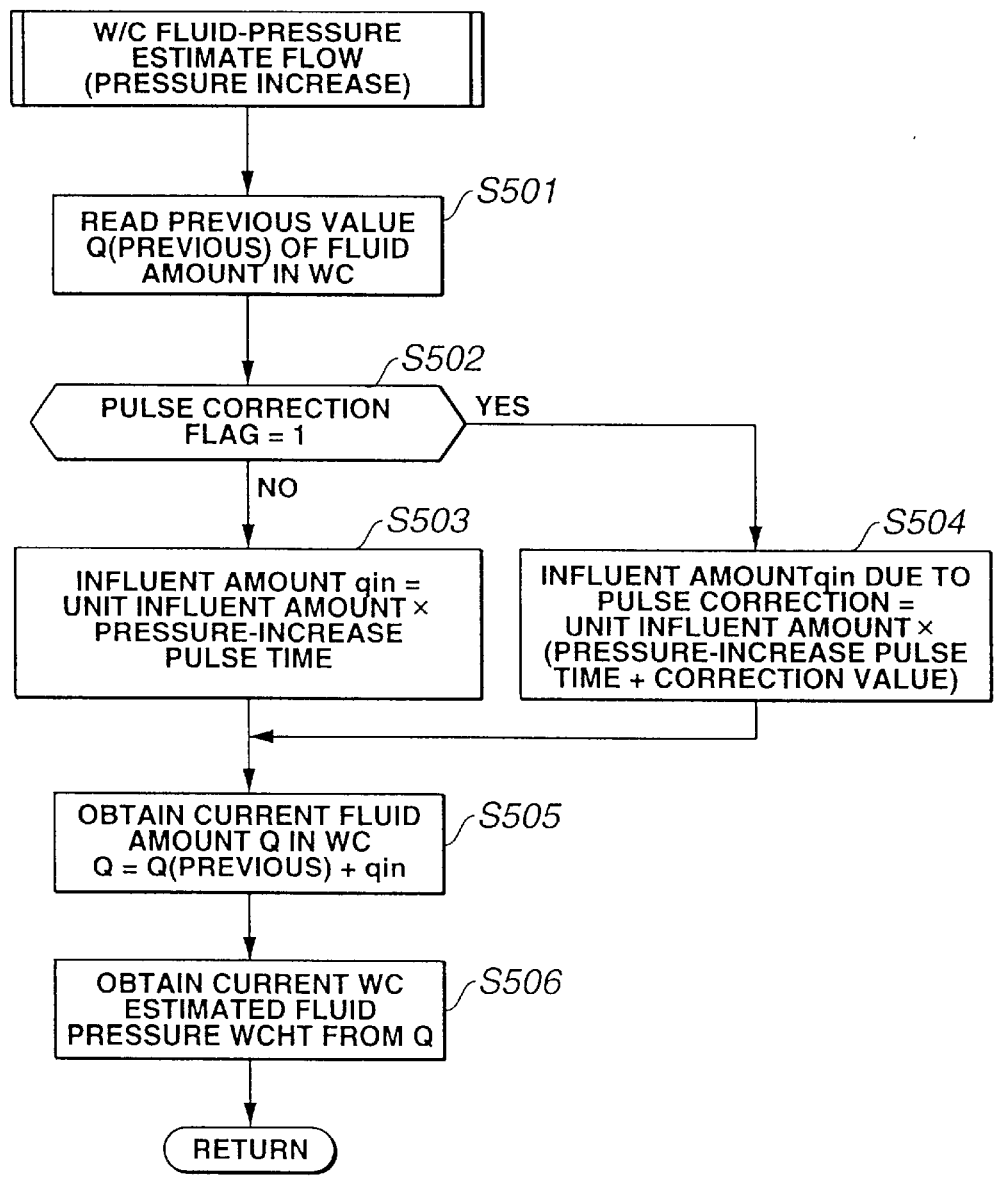
FIG. 5 is a chart similar to FIG. 4, showing operation of the embodiment.
Figure 6:
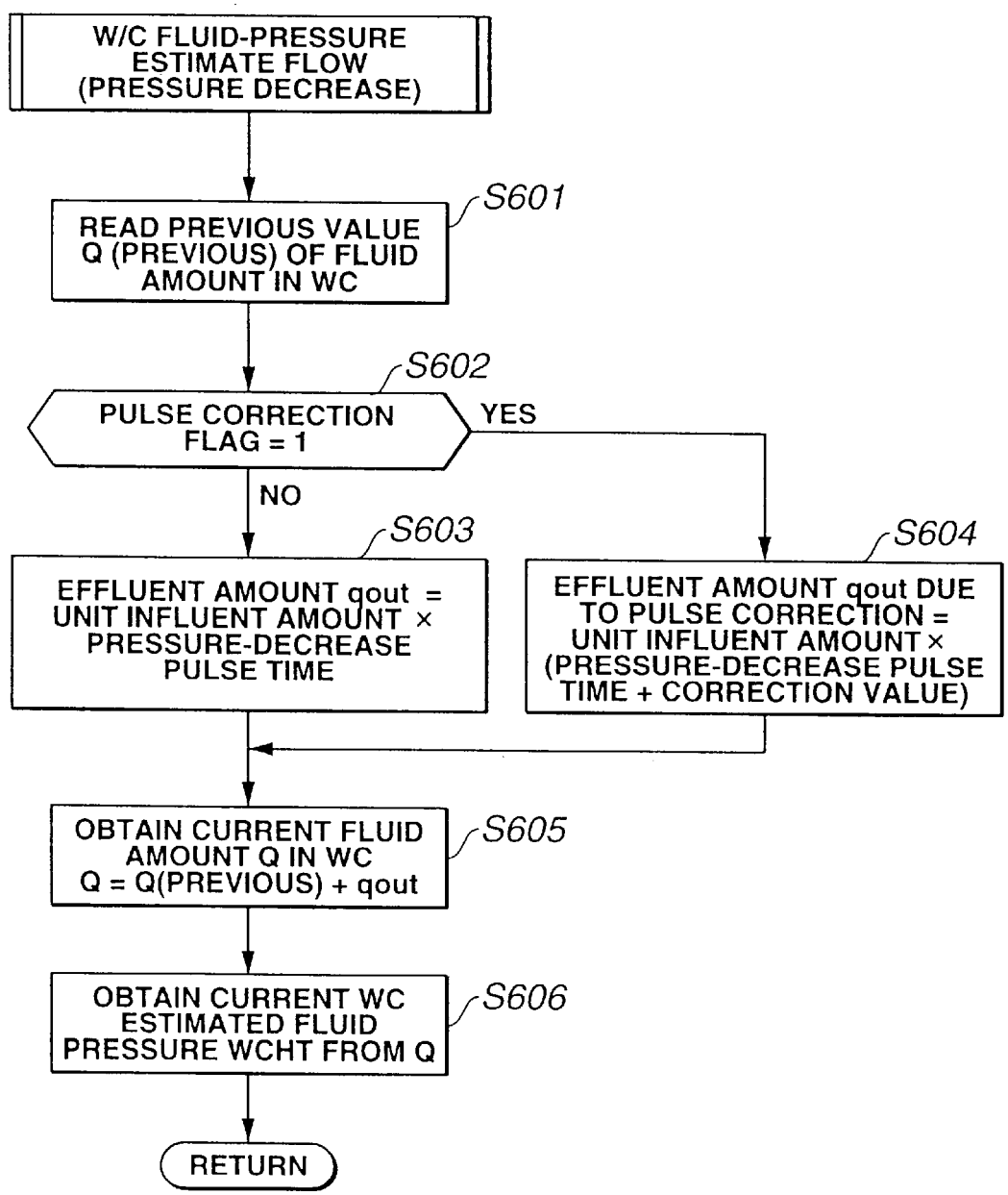
FIG. 6 is a chart similar to FIG. 5, showing operation of the embodiment.

Referring to FIGS. 4–6, a description is made about processing for estimating the W/C pressure or pressure within the wheel-cylinder at step S304.

Referring to FIG. 4, correction-flag setting control is described. Correction-flag setting control is control for setting a correction flag for determining whether or not correction processing is carried out in processing for estimating the W/C pressure.

At a step S401, it is determined whether or not an output time TH of a pressure-retention signal between a previous pulse output (which means an output of a valve opening drive signal) and a current pulse output (which also means an output of a valve opening drive signal) is equal to or smaller than a predetermined threshold value S1. If it is determined that the answer is YES, i.e. TH<S1, flow proceeds to a step S402, whereas it is determined that the answer is NO, TH>S1, flow proceeds to a step S404.

Pressure-retention-signal output time TH is described. Referring to FIG. 7B which shows a case of pressure decrease, during pressure increase or pressure decrease, a control signal is output in one control cycle TP as a duty-ratio signal comprising a pressure-decrease signal or a pressure-increase signal and a pressure-retention signal. The ratio of the pressure-decrease signal to the pressure-retention signal in the duty-ratio signal varies with a difference between a target wheel-cylinder pressure and a current wheel-cylinder pressure. Pressure-retention-signal output time TH is a duration of the pressure-retention signal outputted, which is, for example, 3 msec as shown in FIG. 7B.

Threshold value S1 is determined in accordance with the valve characteristics of inlet valves 21, 22 and outlet valves 41, 42. Specifically, with each valve 21, 22, 41, 42, when an output time becomes short, a valve plunger having a mass, not shown, does not perform movement or following operation in accordance with a drive signal. Specifically, in the case of pressure decrease as shown in FIG. 7B, when outputting a duty-ratio signal comprising a pressure-decrease signal or valve opening drive signal and a pressure-retention signal to outlet valves 41, 42 and when an output time of the pressure-retention signal becomes shorter than a predetermined time, a phenomenon occurs that the valve plunger of outlet valve 41, 42 stops in an open position to disallow a closure of the valve. Likewise, with inlet valves 21, 22, when outputting a pressure-increase signal or valve opening drive signal and a pressure-retention signal and when an output time of the pressure-retention signal becomes shorter a predetermined time, a phenomenon occurs that the valve plunger of inlet valve 21, 22 stops in an open position to disallow a closure of the valve. The predetermined time or value of the output time is set as threshold value S1, which is set to 3 msec in the embodiment. The same threshold value S1 is used for inlet valves 21, 22 and outlet valves 41, 42 in the embodiment. Optionally, different threshold values may be used for the inlet and outlet valves.

At step S402 to which flow proceeds when it is determined at step S401 that TH≦S1, it is determined whether or not a pulse required value in a current control cycle is not zero (a valve opening drive signal is output), i.e. pressure control is in operation. If it is determined that pressure control is in operation, flow proceeds to a step S403 where a pulse correction flag is set to 1, and pulse correction for fluid-pressure calculation is carried out. Note that pulse correction for fluid-pressure calculation is carried out with pressure-retention time TH being a correction value THH.

On the other hand, at step S401 or S402, if it is determined that the answer is NO, flow proceeds to a step S404 where the pulse correction flag is set to zero.

Referring to FIG. 5, a description is made about processing for estimating the W/C pressure during pressure increase. At a step S501, it is read a previous value Q (previous) of the flow amount in wheel cylinder WCxx. Processing for estimating the W/C pressure is carried out independently for each wheel cylinder WCxx wherein xx shows any one of FR, FL, RR, and RL.

At a step S502, it is determined whether or not the pulse correction flag is equal to 1. If it is determined that the pulse correction flag is equal to 1, flow proceeds to a step S504, whereas if it is determined that the pulse correction flag is not equal to 1, flow proceeds to a step S503. At step S503 to which flow proceeds when it is determined at step S502 that the pulse correction flag is not equal to 1, an influent amount qin of brake fluid flowing into wheel cylinder WCxx through inlet valves 21, 22 is calculated in accordance with:

$$qin = \text{unit influent amount} \times \text{required pressure-increase pulse time}$$

wherein the unit influent amount is an influent amount per 1 msec at inlet valves 21, 22. The unit influent amount may be a predetermined constant value in accordance with the characteristics of inlet valves 21, 22, or can be varied in accordance with a differential pressure between a previous pressure PHLHT in supply line H10 and a previous estimated pressure within wheel cylinder WCxx. The latter can provide more accurate estimation.

On the other hand, at step S502, if it is determined that the pulse correction flag is equal to 1, flow proceeds to step S504 where influent amount qin flowing into wheel cylinder WCxx is calculated in accordance with:

$$qin = \text{unit influent amount} \times (\text{required pressure-increase pulse time} + \text{correction value})$$

where the correction value is a value corresponding to a pressure-retention time shorter than threshold value S1 as described above. In such a way, if it is determined that the pulse correction flag is equal to 1, influent amount qin is calculated assuming that inlet valves 21, 22 are open during output of a command for pressure retention as well.

At a step S505 subsequent to step S503 or step S504, a current fluid amount Q in wheel cylinder WCxx is calculated in accordance with:

$$Q = Q(\text{previous}) + qin$$

At a subsequent step S506, current W/C-pressure estimated value WCHT is obtained from current fluid amount Q in wheel cylinder WCxx with reference to lookup of a preset conversion table or in accordance with calculation using a preset arithmetic expression.

Referring to FIG. 6, processing for estimating the W/C pressure during pressure decrease is described. At a step S601, it is read a previous value Q (previous) of the fluid amount in wheel cylinder WCxx. At a step S602, it is determined whether or not the pulse correction flag is equal to 1. If it is determined that the pulse correction flag is equal to 1, flow proceeds to a step S604, whereas if it is determined that the pulse correction flag is not equal to 1, flow proceeds to a step S603. At step S603, an effluent amount qout of brake fluid discharging from wheel cylinder WCxx through outlet valves 41, 42 is calculated in accordance with:

$$qout = \text{unit effluent amount} \times \text{required pressure-decrease pulse time}$$

where the unit effluent amount is an effluent amount per 1 msec at outlet valves 41, 42. The unit effluent amount may be a predetermined constant value in accordance with the characteristics of outlet valves 41, 42, or can be varied in accordance with a differential pressure between a previous pressure PHLHT in supply line H10 and a previous estimated pressure within wheel cylinder WCxx. The latter can provide more accurate estimation.

On the other hand, at step S602, if it is determined that the pulse correction flag is equal to 1, flow proceeds to step S604 where effluent amount qout discharging from wheel cylinder WCxx is calculated in accordance with:

qout=unit effluent amount×(required pressure-decrease pulse time+ correction value)

where the correction value is a value corresponding to a pressure-retention time shorter than threshold value S1 as described above. In such a way, if it is determined that the pulse correction flag is equal to 1, effluent amount qout is calculated assuming that outlet valves 41, 42 are open during output of a command for pressure retention as well.

At a step S605 subsequent to step S603 or step S604, a current fluid amount Q in wheel cylinder WCxx is calculated in accordance with:

Q=Q(previous)−qout

At a subsequent step S606, current W/C-pressure estimated value WCHT is obtained from current fluid amount Q in wheel cylinder WCxx with reference to lookup of a preset conversion table or in accordance with calculation using a preset arithmetic expression.

Referring to FIGS. 7A–7B, examples of operation of braking control are described, wherein FIG. 7A shows a related art, and FIG. 7B shows illustrative embodiment. As is described hereinbefore, in the related art, when outputting a control signal having higher pressure-decrease duty ratio in one control cycle, i.e. a control signal having shorter pressure-retention control time (less than 3 msec) in one control cycle, outlet valves 41, 42 cannot actually respond to higher pressure-retention control time to remain open, leading to continuous decrease in actual fluid pressure. On the other hand, with W/C-pressure estimated value WCHT, since processing is carried out so as not to have a pressure decrease by a pressure-retention time, W/C-pressure estimated value WCHT is calculated to be higher than the actual fluid pressure, resulting in occurrence of an error ΔP.

On the other hand, in the illustrative embodiment, when pressure-retention is carried out to which outlet valves 41, 42 cannot respond, correction value THH for pressure-retention time TH is formed to calculate effluent amount qout assuming that outlet valves 41, 42 are open during pressure-retention time TH as well. Thus, actual W/C pressure corresponds to W/C-pressure estimated value WCHT, leading to enhancement in accuracy of estimation of the W/C pressure as compared with the related art.

Having described the present invention with regard to the illustrative embodiment, it is noted that the present invention is not limited thereto, and various changes and modifications can be made without departing from the scope of the present invention.

By way of example, in the illustrative embodiment, pressure control of the wheel cylinder or brake actuator is carried out by two types of pressure control valve, i.e. inlet valves 21, 22 and outlet valves 41, 42. Optionally, pressure control can be made by a single type of pressure control valve which can selectively form the influent, effluent, and retention states. Moreover, in place of brake fluid, other fluids such as gas can be applied.

Further, in the illustrative embodiment, the present invention is applied to an X-type brake line having two divided line systems. Optionally, the present invention can be applied to another type of brake line having two line systems divided longitudinally or laterally. Moreover, the present invention can be applied to still another type of brake line having four line systems branched to the wheel cylinders.

Furthermore, in the illustrative embodiment, the master-cylinder pressure is obtained by estimation, which allows low-cost structure with no sensor for sensing the master-cylinder pressure. However, it can be obtained, of course, by a sensor for sensing the master-cylinder pressure. Further, in the illustrative embodiment, the present invention is applied to means for estimating a vehicle state in accordance with the vehicle model. Alternatively, the present invention can be applied to any other systems for estimating the braking pressure in accordance with the fluid flow amount as determined.

The entire contents of Japanese Patent Application P2001-384517 filed Dec. 18, 2001 are hereby incorporated by reference.

What is claimed is:

1. A brake control system for a motor vehicle, comprising:
a brake actuator actuated by a fluid pressure;
a pressure control valve which adjusts the fluid pressure within the brake actuator, the pressure control valve selectively carrying out operation for supplying fluid to the brake actuator, operation for discharging fluid from the brake actuator, and operation for retaining fluid in the brake actuator; and
an ECU which controls the pressure control valve, the ECU providing to the pressure control valve a first control signal including a duty-ratio signal comprising a valve opening drive signal as a supplying operation signal and a retaining operation signal upon the supplying operation of the pressure control valve, the ECU comprising an estimate part which is so constructed as to:
totalize an influent amount of fluid in the brake actuator in accordance with an output time of the valve opening drive signal of the first control signal and a supply amount per unit time of fluid in the pressure control valve;
estimate an amount of fluid in the brake actuator in accordance with the influent amount as totalized;
estimate a value of the fluid pressure within the brake actuator in accordance with the amount of fluid as estimated; and
carry out correction for obtaining a supply amount of fluid in the brake actuator when a time of the retaining operation performed by the first control signal is smaller than a predetermined value, the correction being performed by adding a correction value corresponding to the time to the output time of the valve opening drive signal of the first control signal.

2. The brake control system as claimed in claim 1, wherein the predetermined value of the time is set so that even if the retaining operation signal is provided to the pressure control valve, the pressure control valve is maintained in a moving state without carrying out the retaining operation.

3. The brake control system as claimed in claim 1, wherein the ECU provides to the pressure control valve a second control signal including a duty-ratio signal comprising a valve opening drive signal as a discharging operation signal and a retaining operation signal upon the discharging operation of the pressure control valve, wherein the estimate part is so constructed as to:

totalize an effluent amount of fluid in the brake actuator in accordance with an output time of the valve opening drive signal of the second control signal and a discharge amount per unit time of fluid in the pressure control valve;

estimate an amount of fluid in the brake actuator in accordance with the effluent amount as totalized;

estimate a value of the fluid pressure in the brake actuator in accordance with the amount of fluid as estimated; and carry out correction for obtaining a discharge amount of fluid in the brake actuator when a time of the retaining operation performed by the second control signal is smaller than a predetermined value, the correction being performed by adding a correction value corresponding to the time to the output time of the valve opening drive signal of the second control signal.

4. The brake control system as claimed in claim 3, wherein the predetermined value of the time is set so that even if the retaining operation signal is provided to the pressure control valve, the pressure control valve is maintained in a moving state without carrying out the retaining operation.

5. A motor vehicle, comprising:
a source of a fluid pressure;
a brake actuator actuated by the fluid pressure; and
a brake control system comprising:
a pressure control valve which adjusts the fluid pressure within the brake actuator, the pressure control valve selectively carrying out operation for supplying fluid to the brake actuator, operation for discharging fluid from the brake actuator, and operation for retaining fluid in the brake actuator; and
an ECU which controls the pressure control valve, the ECU providing to the pressure control valve a first control signal including a duty-ratio signal comprising a valve opening drive signal as a supplying operation signal and a retaining operation signal upon the supplying operation of the pressure control valve, the ECU comprising an estimate part which is so constructed as to:
totalize an influent amount of fluid in the brake actuator in accordance with an output time of the valve opening drive signal of the first control signal and a supply amount per unit time of fluid in the pressure control valve;
estimate an amount of fluid in the brake actuator in accordance with the influent amount as totalized;
estimate a value of the fluid pressure within the brake actuator in accordance with the amount of fluid as estimated; and
carry out correction for obtaining a supply amount of fluid in the brake actuator when a time of the retaining operation performed by the first control signal is smaller than a predetermined value, the correction being performed by adding a correction value corresponding to the time to the output time of the valve opening drive signal of the first control signal.

6. The motor vehicle as claimed in claim 5, wherein the predetermined value of the time is set so that even if the retaining operation signal is provided to the pressure control valve, the pressure control valve is maintained in a moving state without carrying out the retaining operation.

7. The motor vehicle as claimed in claim 5, wherein the ECU provides to the pressure control valve a second control signal including a duty-ratio signal comprising a valve opening drive signal as a discharging operation signal and a retaining operation signal upon the discharging operation of the pressure control valve, wherein the estimate part is so constructed as to:

totalize an effluent amount of fluid in the brake actuator in accordance with an output time of the valve opening drive signal of the second control signal and a discharge amount per unit time of fluid in the pressure control valve;

estimate an amount of fluid in the brake actuator in accordance with the effluent amount as totalized;

estimate a value of the fluid pressure in the brake actuator in accordance with the amount of fluid as estimated; and carry out correction for obtaining a discharge amount of fluid in the brake actuator when a time of the retaining operation performed by the second control signal is smaller than a predetermined value, the correction being performed by adding a correction value corresponding to the time to the output time of the valve opening drive signal of the second control signal.

8. The motor vehicle as claimed in claim 7, wherein the predetermined value of the time is set so that even if the retaining operation signal is provided to the pressure control valve, the pressure control valve is maintained in a moving state without carrying out the retaining operation.

9. A method of controlling a braking device for a motor vehicle, the braking device comprising:
a brake actuator actuated by a fluid pressure; and
a pressure control valve which adjusts the fluid pressure within the brake actuator, the pressure control valve selectively carrying out operation for supplying fluid to the brake actuator, operation for discharging fluid from the brake actuator, and operation for retaining fluid in the brake actuator, the method comprising:
providing to the pressure control valve a first control signal including a duty-ratio signal comprising a valve opening drive signal as a supplying operation signal and a retaining operation signal upon the supplying operation of the pressure control valve;
totalizing an influent amount of fluid in the brake actuator in accordance with an output time of the valve opening drive signal of the first control signal and a supply amount per unit time of fluid in the pressure control valve;
estimating an amount of fluid in the brake actuator in accordance with the influent amount as totalized;
estimating a value of the fluid pressure within the brake actuator in accordance with the amount of fluid as estimated; and
carrying out correction for obtaining a supply amount of fluid in the brake actuator when a time of the retaining operation performed by the first control signal is smaller than a predetermined value, the correction being performed by adding a correction value corresponding to the time to the output time of the valve opening drive signal of the first control signal.

10. The method as claimed in claim 9, wherein the predetermined value of the time is set so that even if the retaining operation signal is provided to the pressure control valve, the pressure control valve is maintained in a moving state without carrying out the retaining operation.

11. The method as claimed in claim 9, further comprising:

providing to the pressure control valve a second control signal including a duty-ratio signal comprising a valve opening drive signal as a discharging operation signal and a retaining operation signal upon the discharging operation of the pressure control valve;

totalizing an effluent amount of fluid in the brake actuator in accordance with an output time of the valve opening drive signal of the second control signal and a discharge amount per unit time of fluid in the pressure control valve;

estimating an amount of fluid in the brake actuator in accordance with the effluent amount as totalized;

estimating a value of the fluid pressure in the brake actuator in accordance with the amount of fluid as estimated; and carrying out correction for obtaining a discharge amount of fluid in the brake actuator when a time of the retaining operation performed by the second control signal is smaller than a predetermined value, the correction being performed by adding a correction value corresponding to the time to the output time of the valve opening drive signal of the second control signal.

12. The method as claimed in claim 11, wherein the predetermined value of the time is set so that even if the retaining operation signal is provided to the pressure control valve, the pressure control valve is maintained in a moving state without carrying out the retaining operation.

* * * * *